May 15, 1951        J. BECH        2,552,663

MILLING MACHINE PREFERABLY FOR MACHINING PRINTING PLATES

Filed Jan. 19, 1948

INVENTOR
Jorgen Bech,
by John B. Brady
ATTORNEY

Patented May 15, 1951

2,552,663

UNITED STATES PATENT OFFICE 2,552,663

MILLING MACHINE PREFERABLY FOR MACHINING PRINTING PLATES

Jorgen Bech, Lyngby, Denmark

Application January 19, 1948, Serial No. 3,093
In Denmark March 12, 1943

Section 1, Public Law 690, August 8, 1946
Patent expires March 12, 1963

3 Claims. (Cl. 90—15)

The present invention relates to a milling machine preferably of the kind used for machining printing plates, and in which a cutter head holding a cutting tool is arranged for operation in all directions.

The hitherto known milling machines of this kind are subjected to various drawbacks. Thus, for instance, the driving motor that is situated outside the machine necessitates the employment of a number of belts or cords crossing each other, and these belts or cords give occasion to serious wear on all the operating parts, as likewise they limit to some extent the freedom of movement required in machines of this kind for obtaining satisfactory results.

The object of the present invention is to provide a milling machine of the kind in question in which the number of belts or cords is reduced, and in which full freedom of movement is provided, thus ensuring most satisfactory results of work being obtained.

Figure 1:
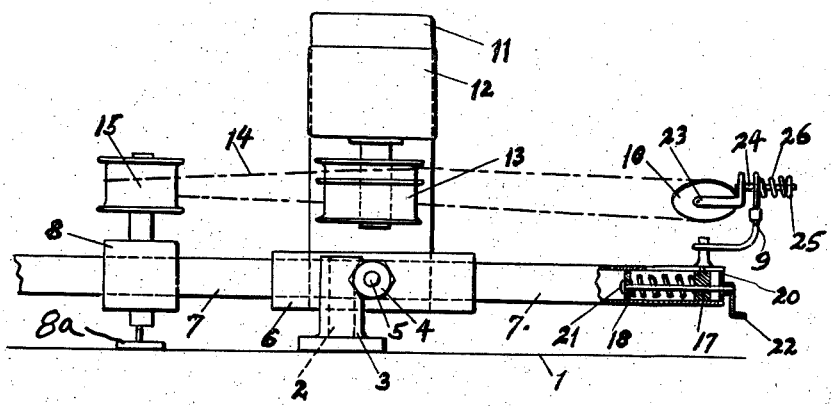
Figure 2:
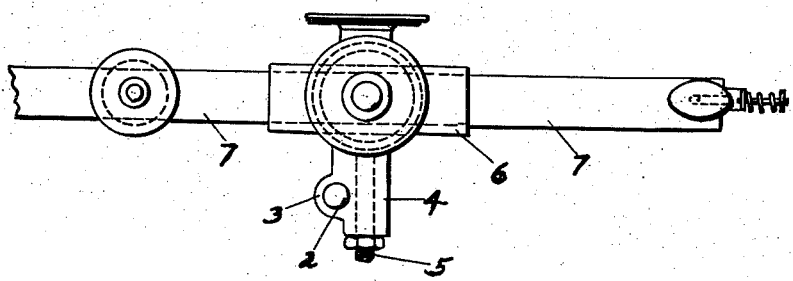

An example of a milling machine according to the invention is described in the following with reference to the accompanying drawing, in which Fig. 1 is a side elevation of the machine with parts thereof shown in section, and Fig. 2 is a top elevation of the machine shown in Fig. 1.

Referring to the drawing, 1 indicates a working table to which a post 2 is vertically attached. A cross-piece 3 is rotatably mounted on the post 2 and provided with a horizontal bore 4 for a pivot pin 5 attached to and projecting from a longitudinal guide member 6. This guide member has a longitudinal hole which in cross section is square, and through which an operating bar 7 having a similar cross section is slidable. At one end this bar 7 is provided with a cutter head 8 that is adjustable on the bar and in which a cutting tool 8a is rotatably mounted. The opposite end of the operating bar 7 carries an arm 9 to the free end of which is attached a tensioning device 10 that is described hereinafter. The bar 7 is slidable within the guide member, and the latter may be oscillated vertically on the pivot pin 5, and rotated horizontally on the post 2, thus providing movement in all directions.

To the side of the guide member 6 opposite that carrying the pivot pin 5 is attached an upwardly extending bracket 11 to which an electromotor 12 is attached in such a position that its shaft extends downwardly centrally above the guide member 6. The motor shaft carries a pulley with two paths for a cord 14 which from the one path of the pulley 13 is wound around a pulley 16 attached to the upper end of the cutting tool 8a, from there is wound around the other path of the motor pulley 13 to a pulley on the tensioning device 10 back to the motor pulley 13.

This tensioning device 10 comprises a pulley rotatably mounted in a holder 23 provided with a threaded pin 24 carried through a smooth hole in the free end of the arm 9, the pin having a nut 26 screwed upon its end and bearing on a coil spring interposed between the nut and the bend 9. In this manner a resilient tensioning of the belt 14 is provided.

In order to regulate the tension of the belt 14, the arm 9 is attached to a member 17 slidable within a cavity 16 in the end of the operating bar 7. A spring 19 is interposed between the member 17 and a nut 18 that is slidable but non-rotatable within the said cavity, and through which nut a rod 21 is screwed, the end of the rod passing through a smooth hole in the member 17 and a likewise smooth hole in the end wall 20 of the cavity, outside which the rod is provided with a handle by means of which it may be rotated for displacing the nut 18 for varying the compression of the spring 19, and accordingly varying the tension of the belt 14.

Preferably the motor 12 is arranged for vertical displacement on the bracket 11 in order to allow the arrangement of any desirable number of transmission members in accordance with the type of transmission employed. Likewise the holder 23, 24 may be arranged for vertical displacement on the arm 9 for the same reason.

The invention is not restricted to the manner of construction described, and illustrated in the accompanying drawing, as it is obvious that alterations are possible within the scope of the invention. For instance the means of transmitting power from the motor to the cutter tool may comprise any other kind of drive such as V belt drive, chain drive, or flat belting with corresponding pulleys.

I claim:

1. A milling machine preferably for machining printing plates, comprising a guide member, means for supporting the guide member for vertical and horizontal rotation, an operating bar longitudinally slidable within the guide member, a cutting tool arranged upon the operating bar, a motor, a bracket attached to the guide member, means for attaching the motor to the bracket centrally above the guide member, a pulley attached to the motor shaft, a pulley attached to the cutter tool, a holder attached to the operating bar, a tension pulley connected to the holder, and a belt carried over the said pulleys.

2. A milling machine as claimed in claim 1, in which the tension pulley holder is slidable within a cavity in the operating bar, and subjected to the action of an adjustable spring.

3. In a milling machine as claimed in claim 1, the arrangement of a pin on the tension pulley, said pin being slidable in the holder and subjected to the action of a spring in relation to the said holder.

JORGEN BECH.

REFERENCES CITED

The following references are of record in the file of this patent:

UNITED STATES PATENTS

| Number | Name | Date |
|---|---|---|
| 447,614 | Knapp | Mar. 3, 1891 |
| 472,546 | McNaull | Apr. 12, 1892 |
| 648,431 | Porter | May 1, 1900 |
| 683,178 | Jackson | Sept. 24, 1901 |
| 889,768 | De Leeuw | June 2, 1908 |
| 1,517,073 | Kent | Nov. 25, 1924 |
| 2,349,004 | Richards | May 16, 1944 |
| 2,386,461 | Hellman | Oct. 9, 1945 |